United States Patent Office 3,801,548
Patented Apr. 2, 1974

3,801,548
POLYURETHANES AND DIISOCYANATO SULFONE AND DIAMINO SULFONE INTERMEDIATES
Ralph P. Williams, Bartlesville, Okla., assignor to Phillips Petroleum Company
No Drawing. Original application May 6, 1969, Ser. No. 822,302, now abandoned. Divided and this application Apr. 14, 1972, Ser. No. 244,273
Int. Cl. C08g 22/20
U.S. Cl. 260—77.5 AT                              7 Claims

ABSTRACT OF THE DISCLOSURE

Polyurethane prepolymer and polyurethane coatings are prepared by reacting under prepolymer forming conditions a new diisocyanato sulfone with a polyol. Importantly, the diisocyanato sulfones which are used as starting material have a relatively low toxicity because they are possessed of relatively low volatility.

---

This is a division of application Ser. No. 822,302, filed May 6, 1969, and now abandoned.

This invention relates to the production of polyurethane prepolymer and to polyurethane coating prepared therewith. It also relates to a non-yellowing coating comprised of polyurethane prepared employing a prepolymer formed with certain new diisocyanato sulfones.

In one of its concepts, the invention provides, as starting materials for the preparation of polyurethane prepolymer and polyurethane coating new compositions of matter or new compounds, having, relatively speaking, a low toxicity, aliphatic diisocyanates, for example, diisocyanato sulfones having the formula

OCNRSO$_2$RNCO wherein each R is a saturated divalent hydrocarbon radical selected from the group consisting of alkylene, cycloalkylene, cycloalkylalkylene, and alkylcycloalkylene, or an arylalkylene hydrocarbon radical, each of said hydrocarbon radicals containing 2 to about 20 carbon atoms and wherein the R's can be the same or different.

The preparation of said diisocyanato compounds is accomplished by reaction of the corresponding diamino sulfone with phosgene, e.g., by reaction of bis(3-aminopropyl) sulfone dihydrochloride to form bis(3-isocyanatopropyl) sulfone.

Still further, in another of its concepts, the invention provides a novel polyurethane prepolymer by reaction of a sulfone as described with a polyol.

In a further concept of the invention, it provides a good, light stable, i.e. non-yellowing polyurethane made from a low toxicity aliphatic diisocyanate of the invention.

Still, an another of its concepts, the invention provides a new amino sulfone hydrochloride, e.g., bis(3-aminopropyl) sulfone dihydrochloride.

The polyurethane field of chemistry has been developing for some time. Polyurethane elastomers, coatings, etc. are well known.

An object of the invention is to provide a novel polyurethane. Another object of the invention is to provide a light stable composition. An object is to provide a novel diamino sulfone. A further object of the invention is to provide a novel polyurethane prepolymer. Still another object of the invention is to prepare a polyurethane coating or similar product.

Other aspects, concepts, objects, and the several advantages of the invention are apparent from a study of this disclosure and the appended claims.

According to the present invention, a non-yellowing polyurethane is prepared from low toxicity aliphatic diisocyanate by reaction thereof with a polyol.

Still according to the present invention, a prepolymer can be prepared by reaction of such a diisocyanate, i.e., sulfone, and a polyol.

The diisocyanates which are used according to the invention can be prepared as follows as illustrated by a representative preparation, i.e., that of bis(3-isocyanatopropyl) sulfone starting with allylamine.

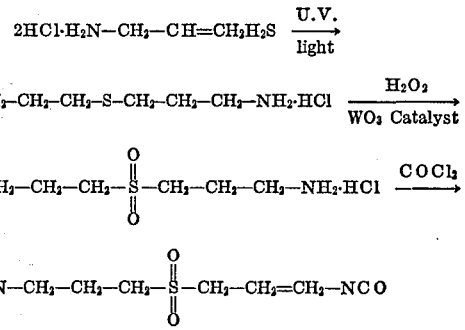

Further according to the invention, the hydrochlorides of the diamino sulfones of the invention are novel.

According to the invention bis(3-aminopropyl) sulfone dihydrochloride was prepared in a 59% yield by the tungstic acid catalyzed oxidation of bis(3-aminopropyl) sulfide dihydrochloride with hydrogen peroxide.

Aliphatic diisocyanato sulfones which can be used in the preparation of the polyurethanes of this invention include those represented by the formula

OCNRSO$_2$RNCO earlier given. Examples of these compounds follow:

bis(2-isocyanatoethyl) sulfone
bis(3-isocyanatopropyl) sulfone
bis(4-isocyanatobutyl) sulfone
bis(2-methyl-6-isocyanatohexyl) sulfone
bis(8-isocyanatodecyl) sulfone
bis(3-methyl-4-isopropyl-10-isocyanatodecyl) sulfone
bis(20-isocyanatoeicosyl) sulfone
bis(4-cyclopentyl-8-isocyanatooctyl) sulfone
bis(3-cyclohexyl-4-isocyanatopentyl) sulfone
bis(2-cyclododecyl-4-isocyanatobutyl) sulfone
bis(3-isocyanatocyclopentyl) sulfone
bis(4-isocyanatocyclohexyl) sulfone
bis(5-isocyanatocyclododecyl) sulfone
bis(2-methyl-3-isocyanatocyclopentyl) sulfone
bis(3-ethyl-5-isocyanatocyclooctyl) sulfone
2-isocyanatoethyl 3-isocyanatopropyl sulfone
bis(2-phenyl-3-isocyanatopropyl) sulfone and the like, and mixtures thereof.

Compounds in which each R is a saturated radical are now preferred, particularly in view of their greater ease of preparation.

The aliphatic diisocyanato sulfones can be prepared by reaction of phosgene with the corresponding diamino sulfones having the formula H$_2$NRSO$_2$RNH$_2$, where R is as defined above, the diamino sulfone preferably being employed as a salt. The phosgenation can be carried out by processes well known in the art, e.g., by the method of Organic Syntheses, Collective volume IV, 521–525 (1963). The diamino sulfones can be prepared as their salts by oxidation of salts of the corresponding diamino sulfides, e.g., with hydrogen peroxide in the presence of a tungsten, molybdenum, or vanadium catalyst as disclosed in Journal of Organic Chemistry, 28, 1140–1142 (1963) for the oxidation of other sulfides.

Polyols which can be used in the preparation of the polyurethanes of this invention can be any of those known in the prior art to be useful in the production of polyurethanes. The preferred polyols are alkanepolyols such as ethylene glycol, trimethylene glycol, 1,4-butanediol, 1,6-hexanediol, 1,10-decanediol, glycerol, trimethylolpropane, 1,2,6-hexanetriol, pentaerythritol, and sorbitol; polyethers such as poly(oxyethylene) glycols, poly(oxypropylene) glycols, poly(oxypropylene)-poly(oxyethylene) copolymers, poly(oxytetramethylene) glycols, poly(oxybutylene) glycols, and poly(oxyalkylene) ethers, e.g., poly(oxypropylene) ethers, of glycerol, trimethylolpropane, 1,2,6-hexanetriol, pentaerythritol, and sorbitol; polyester polyols such as those obtained by the reaction of polybasic acids or anhydrides thereof, e.g., adipic acid, phthalic anhydride, dimerized linoleic acid, or mixtures thereof, or of caprolactone, with polyols, e.g., ethylene glycol, propylene glycol, 1,3-butanediol, 1,4-butanediol, diethylene glycol, glycerol, 1,2,6-hexanetriol, trimethylolethane, trimethylolpropane, pentaerythritol, or mixtures thereof; castor oil and derivatives thereof containing a plurality of hydroxyl groups and produced by processes such as hydrogenation of castor oil or by esterification or transesterification of castor oil, e.g., with polyhydric substances such as ethylene glycol, propylene glycol, glycerol, or pentaerythritol; and the like, and mixtures thereof.

Coating formulations can be prepared directly from the aliphatic diisocyanato sulfones and polyols, or they can be produced from polyols and isocyanate-terminated adducts or prepolymers, the adducts or prepolymers being prepared by the prior reaction of the aliphatic diisocyanato sulfones with limited quantities of polyols. The direct preparation of the coating formulation without the necessity of preparing the adduct or prepolymer intermediate is made practical by the low volatility, and hence the low toxicity, of the diisocyanato sulfones, which are far less volatile than the commercially important tolylene diisocyanates.

When isocyanate-terminated adducts or prepolymers are prepared, the aliphatic diisocyanato sulfone and polyol are mixed in quantities such as to result in about 1.7–2.5 isocyanate groups for each hydroxyl group. Generally a solvent is added to control viscosity. Examples of some suitable solvents include esters such as ethyl acetate, butyl acetate, 2-ethoxyethyl acetate, ketones such as acetone, methyl ethyl ketone, and methyl isobutyl ketone, and mixtures thereof. The mixture is then heated at approximately 50–130° C., preferably about 65–100° C., for a time sufficient to effect reaction of the amount of isocyanate theoretically required to react with all of the hydroxyl groups present, generally about 2–24 hours. The resulting adduct or prepolymer should be protected from atmospheric moisture and basic substances prior to use in a coating formulation.

To prepare the coating formulation the aliphatic diisocyanato sulfone or the isocyanate-terminated adduct or prepolymer produced therefrom is mixed with polyol in such an amount as to provide about 1–1.5, preferably about 1–1.3, isocyanate groups for each hydroxyl group. Sufficient solvent should be added to result in a concentration of polymer-forming components within the range of about 20–65 weight per cent, preferably 30–55 weight percent. The solvent can be any of the solvents described for use in making the isocyanate-terminated adduct or prepolymer, or aromatic hydrocarbons such as toluene or xylenes can be used. Also, mixtures of these applicable solvents can be employed. Additionally, there should be present a substance which catalyzes the reaction of isocyanate groups with hydroxyl groups. Such catalysts are well known in the art and include substances such as amines, e.g., triethylamine, triethylenediamine, N-methylmorpholine, and the like; and metal-containing substances, e.g., dibutyltin dilaurate, dimethyltin dichloride, trimethyltin hydroxide, butyltin trichloride, tributyltin acetate, stannous octoate, tetrabutyltin, cobalt naphthenate, ferric acetylacetonate, and the like. Although the concentration of catalyst in the coating composition can vary over a wide range, it generally will be within the range of about 0.005–1 weight percent, preferably about 0.01–0.1 weight percent.

The coating formulation is applied to the substrate in any convenient manner such as spraying, brushing, or the like. The coating can then be allowed to cure at ambient conditions, or it can be heated, e.g., at approximately 50–130° C. for about 15 minutes to 12 hours, to accelerate curing and evaporation of solvent. Substrates which can be coated include wood, rubber, leather, plastics, textiles, metals, concrete, and the like.

The polyurethane coatings of this invention are particularly resistant to discoloration upon weathering, the extent of yellowing being far less than that exhibited by the most common commercial polyurethane coatings.

EXAMPLE I

Preparation of bis(3-aminopropyl) sulfone dihydrochloride

To a stirred mixture of 59.3 g. (0.4 mole) of bis(3-aminopropyl) sulfide and 75 ml. of water in an ice bath was added slowly, with stirring, 79.0 g. (0.8 mole) of concentrated hydrochloric acid, the temperature of the mixture being maintained below 45° C. To the resulting mixture was added a catalyst solution prepared just previously by blending 0.4 g. of tungstic acid anhydride with a few drops of 50 percent sodium hydroxide into a thick paste, warming the paste on a steam bath while 15 ml. of water was added slowly with stirring to dissolve the solid, and then acidifying the solution of a pH of 6 with glacial acetic acid. The mixture was then heated to 60° C., and 90.7 g. (0.8 mole) of 30 percent hydrogen peroxide was added dropwise over a period of 2 hours. The reaction was very exothermic, and the temperature was controlled at 60° C., by the rate of hydrogen peroxide addition. The resulting mixture was maintained at 70° C. for 1 hour; within 15 minutes a test for peroxide was negative. The pale orange solution was concentrated to 103.8 g. of solid product. Recrystallization of this product from aqueous ethanol gave 59.7 g. (59.0 percent yield) of bis(3-aminopropyl) sulfone dihydrochloride melting at 189–192° C. A second recrystallization gave 48.1 g. of the purified product melting at 192–194° C.

*Analysis.*—Calcd. for $C_6H_{18}Cl_2N_2O_2S$ (percent): C, 28.5; H, 7.2; N, 11.1. Found (percent): C, 28.6; H, 7.2; N, 11.0. An infrared spectrum of the product was consistent with that to be expected for a compound having a sulfone group.

EXAMPLE II

Preparation of bis(3-isocyanatopropyl)sulfone

A suspension of 46.3 g. (0.18 mole) of bis(3-amino)-propyl) sulfone dihydrochloride in 1000 ml. of o-dichlorobenzene was stirred at 155–160° C. for 22 hours while phosgene was bubbled in beneath the surface. Upon completion of the reaction, the mixture was filtered, dichlorobenzene was removed, and the residue was distilled to give as a pale yellow fraction 47.8 g. (65.5 percent yield) of bis(3-isocyanatopropyl) sulfone boiling at 200–205° C. at 0.35 mm. Hg. There was no sign of decomposition.

*Analysis.*—Calcd. for $C_8H_{12}N_2O_4S$ (percent): C, 41.4; H, 5.2; N, 12.1; S, 13.8; free NCO, 36.2. Found (percent): C, 41.4; H, 5.3; N, 11.8; S, 13.3; free NCO, 35.6.

EXAMPLE III

Preparation of prepolymer

A solution of an isocyanate-terminated prepolymer was produced in the following manner. To 14.1 g. (0.0606 mole) of bis(3-isocyanatopropyl)sulfone at 70° C. was added over a period of 30 minutes a mixture of 4.5 g. of ethyl acetate and 13.8 g. (0.0303 mole) of poly(oxypropylene) glycol (Union Carbide Niax Polyol PPG–425) having a hydroxyl number of 245.8 mg. KOH/g. and a calculated molecular weight of 456. To the mixture was added 4.8 g. of ethyl acetate, and the resulting mixture was heated at 65-70° C. for 18 hours. Analysis of the reaction mixture showed the prepolymer contained 6.88 weight percent free isocyanate, as compared with a calculated value of 6.84 weight percent. Thus, the reaction was essentially complete.

EXAMPLE IV

Use of prepolymer to prepare light stable coating

A coating formulation was prepared by mixing 5 g. of the above solution of isocyanate-terminated prepolymer, 0.193 g. of glycerol, 3.1 g. of a solution of 2-ethoxyethyl acetate-toluene (1:1 by weight) containing 0.1 weight percent dibutyltin dilaurate, and 3.0 g. of a 1:1 by weight 2-ethoxyethyl acetate-toluene solution. The resulting formulation had an NCO:OH ratio of 1.3:1, a catalyst concentration of 0.027 weight percent, and 35 weight percent polymer-forming components.

The above coating formulation was applied to microscope slides in a thickness such as to produce on the slides, upon drying in air at about 25° C. for approximately 4 days, a dry film thickness of 0.8-1.6 mils. At the end of this drying time, the yellowness index of the films, as determined by the method of ASTM D1925-63 T, was 0.5-0.8. The films were then subjected to accelerated weathering tests by the method of ASTM E 42-57, using an Atlas Weatherometer, a 2500-watt xenon light source, a temperature of 63° C., a relative humidity of 50 percent, and continuous exposure of the specimens. After 90 hours of this accelerated weathering treatment, the yellowness index of the films was only 1.9, and even after 400 hours of this treatment, the yellowness index was merely 3.4. Thus, the extent of yellowing was only slight.

Control runs were carried out in which coatings were prepared as described above except that a commercial diisocyanate mixture (approximately 80 percent 2,4-tolylene diisocyanate and 20 percent 2,6-tolylene diisocyanate) was substituted for the bis(3-isocyanatopropyl) sulfone. The coatings thus prepared were subjected to weathering as described above. Before the weathering treatment the yellowness index of the films was —0.5. However, after 93 hours of the weathering treatment the yellowness index increased to 10.1-11.1, and after 401.5 hours the yellowness index had increased to 18.0-18.9. Thus, the extent of yellowing exhibited by these films from the control runs was far greater than that observed for the films produced through the use of bis(3-isocyanatopropyl) sulfone.

Reasonable variation and modification are possible within the foregoing disclosure and the appended claims to the invention, the essence of which is that new compounds useful in the preparation of polyurethanes, i.e. low toxicity diisocyanates having a structural formula as set forth and described herein which are produced by conversion, as described herein, of the corresponding diamino sulfone, e.g., as by conversion of bis(3-aminopropyl)sulfone dihydrochloride which can be produced by oxidation of salts of diamino sulfides, e.g., bis(3-aminopropyl) sulfide dihydrochloride as with a catalyst, as described herein are used to prepare polyurethanes by reaction of the produced aliphatic diisocyanato sulfones with polyols also substantially as described herein.

I claim:

1. A polyurethane, isocyanate terminated prepolymer prepared by reacting with a polyol and a suitable catalyst an excess of an aliphatic diisocyanato sulfone compound having the formula $OCNRSO_2RNCO$ wherein each R is a saturated divalent hydrocarbon radical selected from the group consisting of alkylene, cycloalkylene, cycloalkylalkylene, and alkylcycloalkylene, or an arylalkylene hydrocarbon radical, each of said hydrocarbon radicals containing 2 to about 20 carbon atoms and wherein the R's can be the same or different.

2. A polyurethane prepolymer according to claim 1 prepared under prepolymer forming conditions with a polyol bis(3-isocyanatopropyl) sulfone.

3. A polyurethane formulation suitable for use in forming a coating, the formulation being formed by bringing together under polyurethane forming conditions a polyurethane forming catalyst, a polyol and a prepolymer according to claim 2.

4. A non-yellowing coating obtained by use of a polyurethane coating formulation according to claim 3.

5. A polyurethane formulation suitable for use in forming a coating, the formulation being formed by bringing together under polyurethane forming conditions a polyurethane forming catalyst, a polyol and a prepolymer according to claim 1.

6. A non-yellowing coating obtained by use of a polyurethane coating formulation according to claim 5.

7. A polyurethane suitable for use as a coating prepared by reacting with a polyol and a suitable catalyst an excess of an aliphatic diisocyanato sulfone compound having the formula $OCNRSO_2RNCO$ wherein each R is a saturated divalent hydrocarbon radical selected from the group consisting of alkylene, cycloalkylene, cycloalkylalkylene, and alkylcycloalkylene, or an arylalkylene hydrocarbon radical, each of said hydrocarbon radicals containing 2 to about 20 carbon atoms and wherein the R's can be the same or different.

References Cited
UNITED STATES PATENTS

| | | | |
|---|---|---|---|
| 3,660,357 | 5/1972 | Kolycheck | 260—77.5 AT |
| 3,681,288 | 8/1972 | Bonin et al. | 260—77.5 AP |

MAURICE J. WELSH, Primary Examiner

U.S. Cl. X.R.

260—2.5 AT, 75 NT, 583 EE